United States Patent [19]
Takahashi et al.

[11] Patent Number: 5,357,904
[45] Date of Patent: Oct. 25, 1994

[54] TOYS FOR CATS

[75] Inventors: Hiroki Takahashi; Akio Fujiwara, both of Osaka, Japan

[73] Assignee: Hotta Co., Ltd., Osaka, Japan

[21] Appl. No.: 948,308

[22] Filed: Sep. 22, 1992

[30] Foreign Application Priority Data

Jun. 1, 1992 [JP] Japan ................. 4-036942

[51] Int. Cl.⁵ .................................. A01K 29/00
[52] U.S. Cl. ........................ 119/708; 428/11
[58] Field of Search ........... 119/29, 29.5, 106, 708; 446/227; 428/10, 11, 28

[56] References Cited

U.S. PATENT DOCUMENTS

| | | | |
|---|---|---|---|
| 355,663 | 1/1887 | Price | 446/227 |
| 1,482,537 | 2/1924 | Alter et al. | 428/10 |
| 1,625,539 | 4/1927 | Herskovitz | 428/10 X |
| 1,904,470 | 4/1933 | Kelman | 428/10 |
| 2,698,598 | 1/1955 | Hadley | 119/29 |
| 2,851,271 | 9/1958 | Suter | 446/227 X |
| 3,223,373 | 12/1965 | Molinaro | 428/11 X |
| 3,727,583 | 4/1973 | Muraro | 119/29 |
| 4,884,807 | 12/1989 | Welch | 119/707 X |
| 5,022,345 | 6/1991 | Bolivar et al. | 119/29 |

FOREIGN PATENT DOCUMENTS 286728 10/1988 European Pat. Off. ............ 119/106

*Primary Examiner*—Robert P. Swiatek
*Attorney, Agent, or Firm*—Wenderoth, Lind & Ponack

[57] ABSTRACT

Toys for cats of a desired cubic structure are formed with a main body including a core element and a braid proper. The braid proper is formed by braiding together braid elements around the core element. Each of the braid elements includes one or more single yarns and each of the single yarns is made by braiding warping or twisting together synthetic fiber yarns.

11 Claims, 7 Drawing Sheets

5,357,904

TOYS FOR CATS

BACKGROUND OF THE INVENTION

1. Field of the Invention

This invention relates to toys for domestic pets, especially for cats.

2. Prior Art

There have been provided various kinds of toys for cats, most of which are molded products made of plastic or rubber. However, such plastic products are liable to break, and as a result are dangerous for cats. Likewise, the rubber-molded products are liable to be torn off and furthermore such rubber-molded products are inferior in weather resistance, thus resulting in poor durability. There also have been provided toys for cats made of fiber materials, but such products also show poor durability.

SUMMARY OF THE INVENTION

It is therefore an object of the present invention to provide toys for cats made of fiber materials which show high safety and high durability.

In order to achieve the above objects, a braid structure is applied to toys for cats. That is, the toys for cats according to the present invention utilize the structural strength of a braid structure which is made durable so that it does not loosen, and include a reinforcing core element. Thus, the toys for cats made of fiber materials, having high safety and high durability, can be provided.

In other words, the present invention is characterized in that toys for cats are of a desired form having a main body comprising a core element and a braid proper which is formed by braiding together braid elements around the core element. The individual braid element comprises one or more single yarns made by braiding, warping or twisting together synthetic fiber yarns.

As for synthetic fiber yarns, such materials as nylon, polyester, polypropylene, acryl or the like can be used. As for the core element, a polyvinylchloride or urethane bar or foamed plastic bar such as a foamed polyethylene bar can be used.

Although the toys according to the present invention are provided by constructing a structure of a desired form using a main body and additional elements such as a stretchable strap to be connected to the main body, a bell disposed within an internal space surrounded by the main body and so forth.

As mentioned above, the toys according to the present invention are fiber products which will not break or tear and mainly comprise a braid structure which is superior in structural strength, so that the toys obtained are highly durable and cause no harm to cats.

Aside from the braid structure, the braid element comprises one or more single yarns made by braiding, warping or twisting together synthetic fiber yarns, wherein the plurality braid elements are braided together around a core element to form a braid proper. Thus the braid proper per se is strong. If the braid proper is made by braiding together multifilaments, a mere bundle of filaments is liable to become loosened, so that the braid proper made of multifilaments is easily loosened or fluffed by a cat's nails. On the other hand, the braid elements in the present invention comprise one or more single yarns made by braiding, warping or twisting together synthetic fiber yarns, so that the braid proper is so strong that it will not become loosened or fluffed, and toys of high durability are provided.

Furthermore, the braid structure is an endless (closed) structure so that it includes an open center portion. In spite of this, however, because the aforesaid braid elements are braided together around the core element so as to form the main body, the braid proper is a fixed and highly durable structure, and forms a highly durable toy.

DETAILED DESCRIPTION OF THE INVENTION

Figure 1:
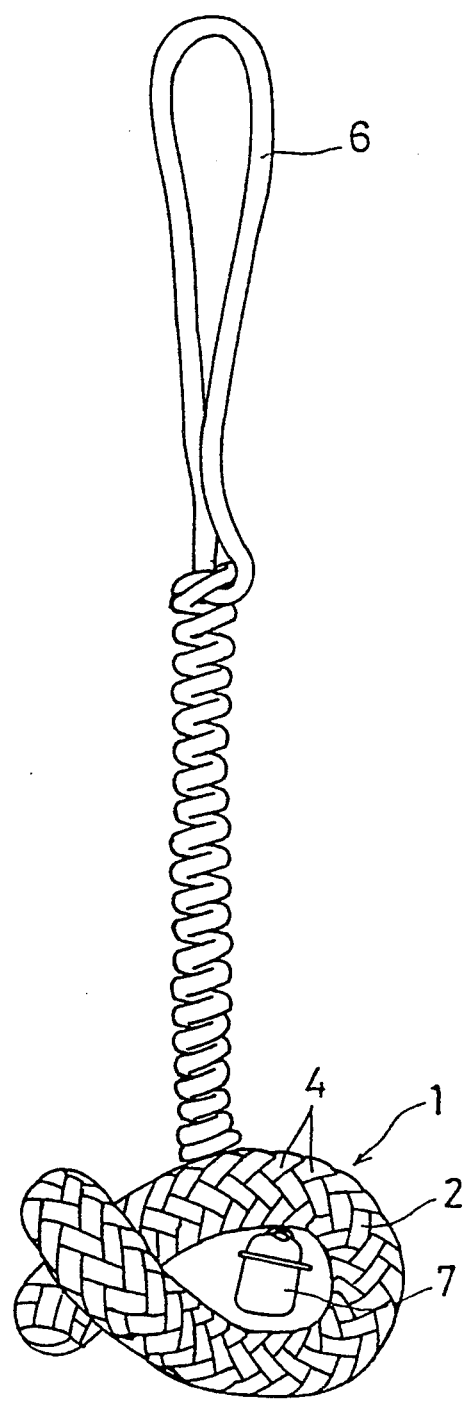
FIG. 1 is a front view showing one embodiment of a toy for cats according to the present invention.
Figure 6:
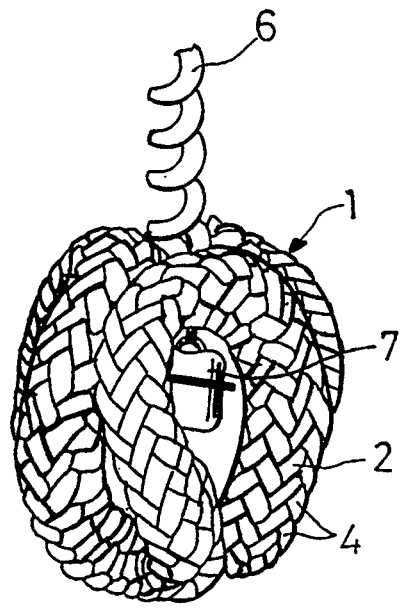
FIG. 6 is a perspective view of a main body of the toy shown in FIG. 5.
Figure 2:
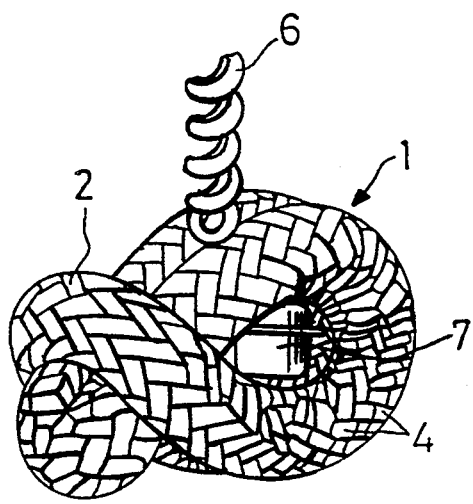
FIG. 2 is a perspective view of a main body of the toy shown in FIG. 1.
Figure 3:
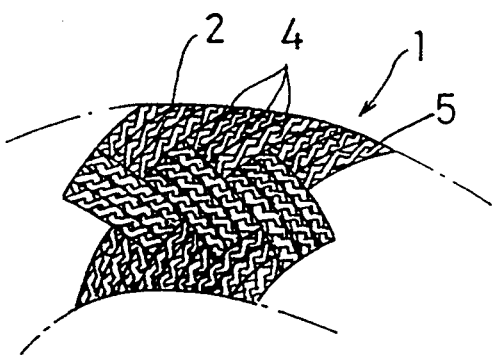
FIG. 3 is a partially enlarged front view of the main body showing a structure of a braid proper.
Figure 4:
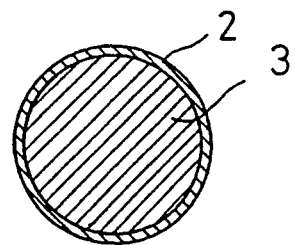
FIG. 4 is a vertical sectional view of the main body.

The present invention will now be described referring to the drawings.

The drawings show embodiments of a toy for cats according to the present invention. The numeral 1 represents a main body formed with a desired structure comprising a braid proper 2 and a core element 3 positioned therein. Numeral 4 represents braid elements which form the braid proper 2, and numeral 5 represents single yarns which constitute the braid element 4.

The main body 1 comprises the core element 3 and the braid proper 2 which is formed by braiding together a plurality of braid elements 4 around the core element 3. Each of the braid elements 4 comprises a plurality of single yarns 5. Each of the single yarns 5 is made by braiding together comparatively fine synthetic fiber yarns. The core element 3 is made of a foamed polyethylene bar.

Figure 5:
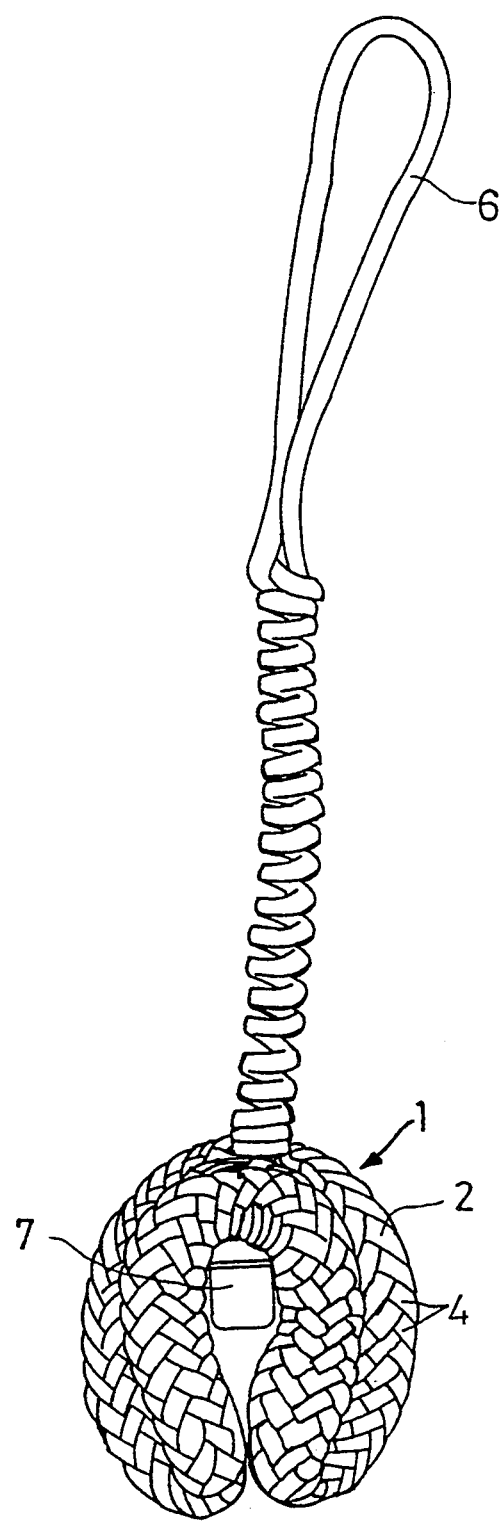
FIG. 5 is a front view showing another embodiment of a toy for cats according to the present invention.
Figure 7:
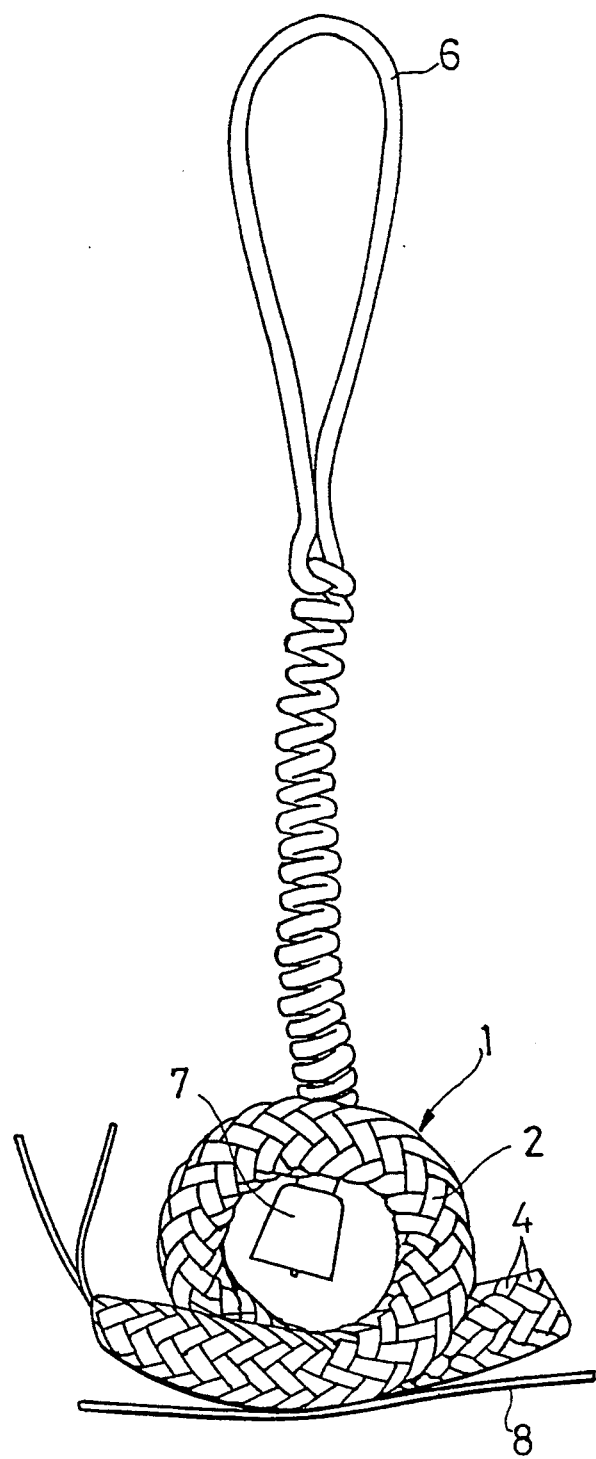
FIG. 7 is a front view of another embodiment according to the present invention.
Figure 8:
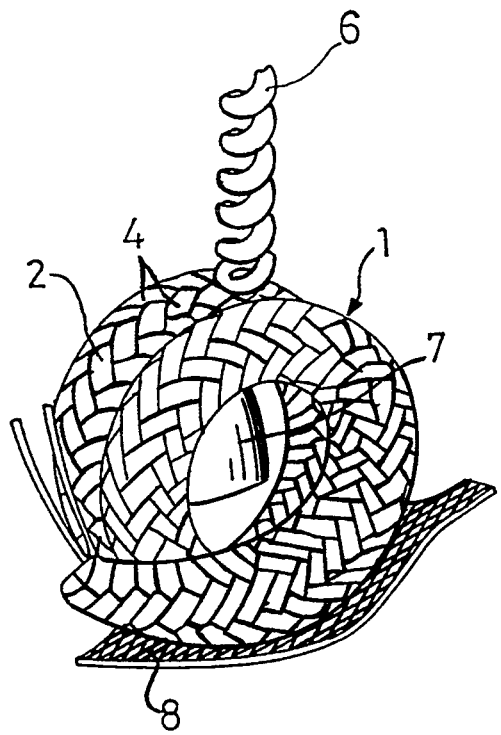
FIG. 8 is a perspective view of a main body of the toy shown in FIG. 7.
Figure 10:
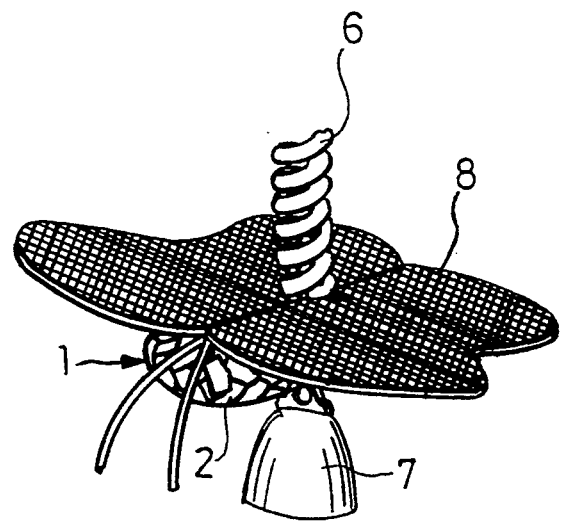
FIG. 10 is a perspective view of a main body of the toy shown in FIG. 9.
Figure 9:
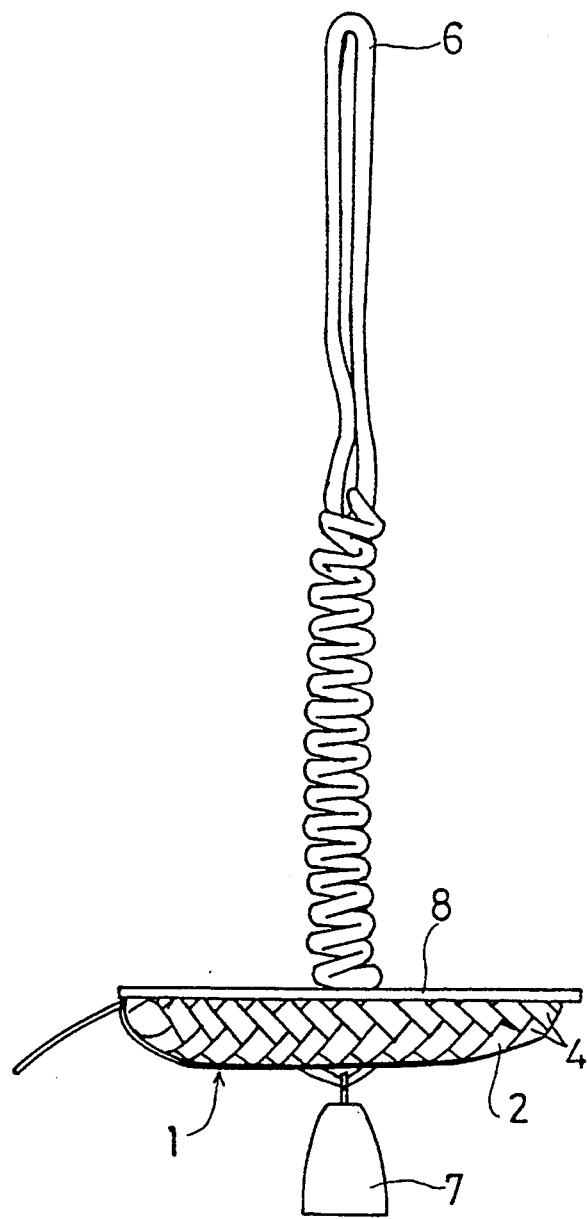
FIG. 9 shows yet another embodiment according to the present invention.

Various structures of toys as illustrated are formed as follows. First an appropriate length of the main body 1 is prepared by cutting an elongated main body material comprising the core element 3 and the braid proper 2. Then the toys, for example, as shown in FIG. 1 and FIG. 5 are formed by joining both ends of the main body 1 and thermally welding them to form an endless shape. More specifically the endless main body 1 is transformed into a desired structure by a twisting and/or a drawing-in operation, and by then joining the opposite surfaces thereof by thermal welding to form the final structure.

The numeral 6 represents a stretchable (elastic) strap connected to the main body 1 by joining the end of the strap to the surface of the braid proper 2 by thermal welding. When a bell 7 is disposed in an internal space of the main body 1, the end of the strap may be passed through a hook portion of the bell and joined to the surface of the braid proper 2 by thermal welding. The strap is connected strongly to the main body 1 when the end of the strap is joined by thermal welding at the joint between the opposite end surfaces of the main body at the same time as the opposite end surfaces are being joined by thermal welding.

Various structures of toys can be provided by joining the opposite end surfaces of a plurality of endless main bodies by thermal welding. Furthermore the toys can be modified by joining a desired shape of a woven fabric 8 to the main body by thermal welding. In addition, when a plurality of single yarns 5 or a plurality of braid elements 4 having different colors are used, beautiful toys having colorful braid structures can be obtained.

Further, the opposite surfaces of the main body can be strongly joined if a patch of the same material extending over the joint portion is joined by thermal welding to both surfaces of the main body in the vicinity of the joint portion.

As mentioned above, the toys for cats in accordance with the present invention are provided by utilizing the structural strength of the braid structure, employing the braid structure which hardly becomes loosened or fluffed, and constituting a strong braid structure formed by braiding together the braid elements around the core element. Accordingly, the present invention can provide novel toys for cats, which have never been provided, which are highly durable for long term use, which rarely break or become torn, which cause no harm to cats and which have a beautiful appearance provided by the braid structure.

We claim:

1. A toy for cats, comprising:
a main body including a core element and a braid proper formed by braiding together braid elements, each of which comprises at least one yarn formed by braiding warping or twisting together synthetic fibers;
a bell disposed within an internal space surrounded by said main body.; and
an elastic strap connected to said main body.

2. A toy as recited in claim 1, wherein
said braid elements are braided around said core element.

3. A toy for cats, comprising:
a core element formed into an endless loop so as to define an internal space therewithin;
a braid proper formed by braiding together braid elements around said core element, each of said braid elements comprising at least one yarn made by braiding, warping or twisting together synthetic fibers;
wherein said core element and said braid proper together constitute a main body; and
wherein an elastic strap is connected to said main body.

4. A toy as recited in claim 3, wherein
said core element comprises a bar formed into said endless loop.

5. A toy as recited in claim 4, wherein
said bar is formed of polyvinylchloride.

6. A toy as recited in claim 4, wherein
said bar is formed of urethane.

7. A toy as recited in claim 4, wherein
said bar is formed of foamed plastic.

8. A toy as recited in claim 4, wherein
said foamed plastic comprises foamed polyethylene.

9. A toy as recited in claim 3, wherein
said synthetic fibers are formed of a material selected from the group consisting of nylon, polyester, polypropylene and acryl.

10. A toy as recited in claim 3, further comprising
a bell mounted within said internal space of said endless loop.

11. A toy for cats, comprising
a main body including a core element and a braid proper formed by braiding together braid elements, each of which comprises at least one yarn formed by braiding, warping or twisting together synthetic fibers;
an elastic strap connected to said main body; and
a woven fabric element connected to said main body.

* * * * *